US008401572B2

(12) United States Patent
Chandra et al.

(10) Patent No.: US 8,401,572 B2
(45) Date of Patent: *Mar. 19, 2013

(54) METHOD AND APPARATUS FOR PROVIDING LOCATION BASED SERVICES USING CONNECTIVITY GRAPHS BASED ON CELL BROADCAST INFORMATION

(75) Inventors: Umesh Chandra, Sunnyvale, CA (US); Deepti Chafekar, Sunnyvale, CA (US); Tochukwu Iwuchukwu, Mountain View, CA (US)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,174

(22) Filed: Sep. 5, 2012

(65) Prior Publication Data

US 2012/0329482 A1    Dec. 27, 2012

Related U.S. Application Data

(63) Continuation of application No. 12/571,988, filed on Oct. 1, 2009, now Pat. No. 8,290,516.

(51) Int. Cl.
  *H04W 24/00* (2009.01)
(52) U.S. Cl. .................. 455/457; 455/456.3; 455/456.1; 455/456.2; 455/550.1
(58) Field of Classification Search .................. 455/454, 455/450, 451, 452.1, 452.2, 67.13, 69, 3.06; 725/68, 95; 370/328–341
See application file for complete search history.

(56) References Cited

U.S. PATENT DOCUMENTS

| 7,096,030 | B2 | 8/2006 | Huomo |
| 7,822,423 | B2 | 10/2010 | Maanoja et al. |
| 2004/0085961 | A1 | 5/2004 | Coffell et al. |
| 2006/0025157 | A1 | 2/2006 | Kuwahara et al. |
| 2006/0187028 | A1 | 8/2006 | Kiang et al. |
| 2007/0018890 | A1 | 1/2007 | Kulyukin |
| 2007/0280152 | A1 | 12/2007 | Thomson et al. |
| 2008/0019299 | A1 | 1/2008 | Lekutai et al. |
| 2008/0151821 | A1 | 6/2008 | Cho et al. |
| 2010/0113066 | A1 | 5/2010 | Dingler et al. |

FOREIGN PATENT DOCUMENTS

| EP | 0873662 A1 | 10/1998 |
| EP | 1060622 A2 | 12/2000 |
| EP | 1166573 A1 | 1/2002 |
| EP | 1 670 268 A1 | 6/2006 |
| WO | WO 98/19479 A1 | 5/1998 |
| WO | WO 99/45725 A2 | 9/1999 |
| WO | WO 00/54524 A1 | 9/2000 |
| WO | WO 03/105501 A1 | 12/2003 |
| WO | WO 2007/101167 A1 | 9/2007 |

OTHER PUBLICATIONS

Analysis of the Short Message Service (SMS) and Cell Broadcast Service (CBS) for Emergency Messaging Applications, Emergency Messaging, SMS and CBS, Published: Feb. 2006, pp. 1-16.
International Search Report and Written Opinion for corresponding International Application No. PCT/FI2010/050691 dated Jan. 7, 2011, pp. 1-12.
S. Nanz et al.: Topology-Dependent Abstractions of Broadcast Networks (Abstract). Lecture Notes in Computer Science, Informatics and Mathmatical Modeling, pp. 1-3.

*Primary Examiner* — Kathy Wang-Hurst
(74) *Attorney, Agent, or Firm* — Ditthavong Mori & Steiner, P.C.

(57) ABSTRACT

An approach is provided for providing location based services using connectivity graphs based on cell broadcast information. A plurality of cell broadcast message identifiers are caused to be received. Cell broadcast message identifiers are respectively associated with a plurality of cells. A connectivity graph specifying relationships among the cells is generated for providing a location based service.

9 Claims, 10 Drawing Sheets

FIG. 8

12:00 p    Strong | 45%

QUERY: DIRECTIONS TO DESTINATION

- - - - - - - - - - - - - - -
| DESTINATION:              | — 801
| 1600 PENNSYLVANIA AVENUE  |
- - - - - - - - - - - - - - -

| CURRENT LOCATION: NATIONAL ZOO |  — 803

| NEXT LOCATION: DUPONT CIRCLE |  — 805

| NEXT LOCATION: FARRAGUT NORTH |  — 807

| ARRIVE AT: WHITE HOUSE |  — 809

> MORE        EDIT        < BACK

800

US 8,401,572 B2

METHOD AND APPARATUS FOR PROVIDING LOCATION BASED SERVICES USING CONNECTIVITY GRAPHS BASED ON CELL BROADCAST INFORMATION

CROSS REFERENCE TO RELATED APPLICATIONS

This application is a continuation of U.S. application Ser. No. 12/571,988, filed Oct. 1, 2009, the entirety of which is incorporated herein.

BACKGROUND

Service providers and device manufacturers are continually challenged to deliver value and convenience to consumers by, for example, providing compelling network services. These services may include location based services for the consumers. However, many location based services rely heavily on global positioning system technology and information to determine the location of a user to provide the location based services. Participation in these location based services by users, however may be limited because the user may not have access to a device capable of using such technology.

Some Example Embodiments

According to one embodiment, a method comprises causing, at least in part, receiving a plurality of cell broadcast message identifiers. The method also comprises associating the cell broadcast message identifiers respectively with a plurality of cells. The method further comprises generating a connectivity graph specifying relationships among the cells for providing a location based service.

According to another embodiment, an apparatus comprising at least one processor, and at least one memory including computer program code, the at least one memory and the computer program code configured to, with the at least one processor, cause, at least in part, the apparatus to cause, at least in part, receiving a plurality of cell broadcast message identifiers. The apparatus is also caused, at least in part, to associate the cell broadcast message identifiers respectively with a plurality of cells. The apparatus is further caused, at least in part, to generate a connectivity graph specifying relationships among the cells for providing a location based service.

According to another embodiment, a computer-readable storage medium carrying one or more sequences of one or more instructions which, when executed by one or more processors, cause, at least in part, an apparatus to cause, at least in part, receiving a plurality of cell broadcast message identifiers. The apparatus is also caused, at least in part, to associate the cell broadcast message identifiers respectively with a plurality of cells. The apparatus is further caused, at least in part, to generate a connectivity graph specifying relationships among the cells for providing a location based service.

According to another embodiment, an apparatus comprises means for causing, at least in part, receiving a plurality of cell broadcast message identifiers. The apparatus also comprises means for associating the cell broadcast message identifiers respectively with a plurality of cells. The apparatus further comprises means for generating a connectivity graph specifying relationships among the cells for providing a location based service.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 8 is a diagram of a user interface utilized in the processes of FIG. 7, according to one embodiment;

DESCRIPTION OF SOME EMBODIMENTS

Examples of a method, apparatus, and computer program for providing location based services using connectivity graphs based on cell broadcast information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
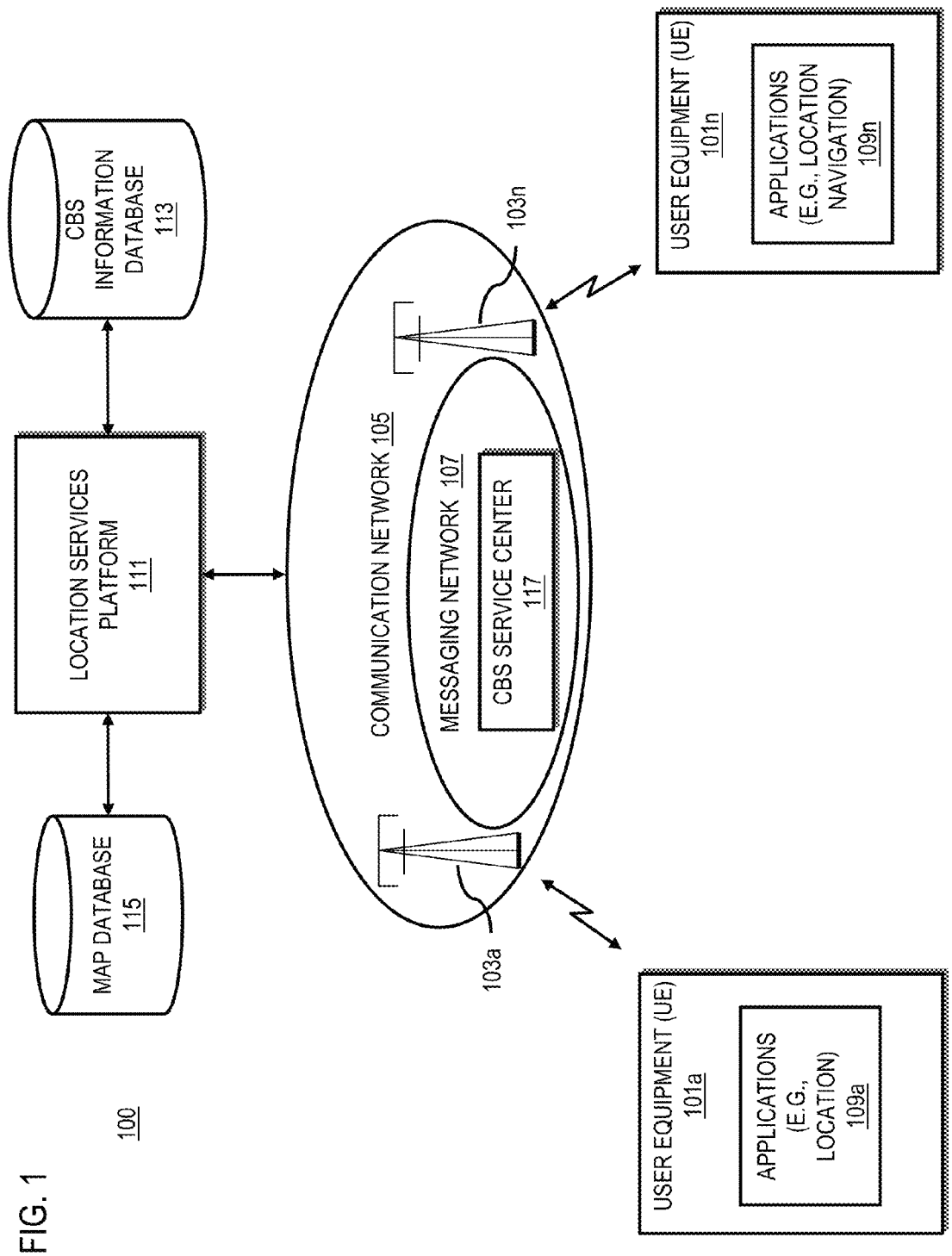
FIG. 1 is a diagram of a system capable of providing location based services using connectivity graphs based on cell broadcast information, according to one embodiment.

FIG. 1 is a diagram of a system 100 capable of providing location based services using connectivity graphs based on cell broadcast information, according to one embodiment. Navigation and location based services are utilized by many users of user equipment (UE) 101a-101n. Many of these services rely on a global positioning system (GPS) or other location information such as cell identifiers (CellID). As such, some UEs 101 that use these services may include GPS technology. However, some users may not wish to utilize the GPS technology for one or more reasons such as cost, power consumption, availability, etc. In some cases, the technology is not available because the UE 101 may not have the capability or because the UE 101 is in an area with poor GPS reception. In some scenarios, the UEs 101 may include the capability to receive CellIDs and utilize cell of origin technology to receive location based services. CellIDs can be mapped to a location based on databases; however, service providers that own cell towers may be unwilling to provide location information of the cell towers 103a-103n and created third party databases of cell tower 103 locations may be incomplete.

To address this problem, a system 100 of FIG. 1 introduces the capability to provide location based services using connectivity graphs based on cell broadcast information. The cell broadcast information from a cell broadcast service (CBS) can be collected by UEs 101 that may receive CBS messages from cellular towers 103, such as base stations, that are part of a communication network 105. The cell towers 103 may also be a part of a messaging network 107 that can be used to send and receive messages to and from UEs 101. An application 109, such as a location application 109 can be used to collect CBS message information and CellID information. The location application 109 can then send CBS message information and CellID information to a location services platform 111 via the messaging network 107 and/or the communication network 105. The CBS message information and CellID information may then be stored in a CBS information database 113. A lookup table can be constructed mapping the CellIDs to respective CBS location information. The location services platform 111 may determine the relationships between cell tower cells, which can have CellIDs, associated with the CBS message information. These relationships can be used to construct a connectivity graph that can be stored in the CBS information database 113. Moreover, the CBS message information can be associated with a map database 115 that can include information about locations and points-of-interest (POIs). The map database 115 can be associated with the CBS information database 113 by correlating information about cells of the CBS information database 113 to geographical areas of the map database 115. These databases can be used in conjunction with the location services platform 111 to provide location based services to UEs 101.

As shown in FIG. 1, the system 100 comprises a user equipment (UE) 101 having connectivity to a location services platform 111, other UEs 101, message services center (MSC) via a communication network 105. By way of example, the communication network 105 of system 100 includes one or more networks such as a data network (not shown), a wireless network (not shown), a telephony network (not shown), a messaging network 107 or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like. Moreover, the messaging network 107 can provide, according to certain embodiments, services such as email, instant messaging (IM), short message service (SMS) messaging (e.g., text messaging), multimedia message service (MMS), CBS messaging, or other messaging communication.

As noted, the messaging network 107 can provide for SMS messaging, MMS messaging capabilities, or CBS messaging. The messaging network 107 may be a part of a telephony network (e.g., a cellular network). As part of a cellular network, UE 101 can communicate with a cellular tower 103 to send and receive data including SMS messaging and MMS messaging. Cellular towers 103 communicate with a UE 101 via control channels so that the UE 101 is able to ascertain which cellular tower 103 to connect to. A control channel can also be utilized to deliver messages. A message can be sent to a UE 101 via a cellular tower 103 and a MSC. The MSC can be used as a medium between the cellular network and internet protocol networks designed to carry messaging traffic. The message can have information about the message and the destination such as the length of the message, a time stamp, the destination phone number, etc., which can be used to route the message to the destination. In one example, location services platform 111 can send a message to the UE 101 via the messaging network 107 by sending the message to the MSC via an internet protocol network. Then, the MSC can deliver the message to the UE 101 via the cellular tower control channel.

Moreover, the cellular network may also include CBS messaging capabilities. Network service operators may use a CBS service center 117 to send a cell broadcast to communicate information such as an area code for a cell tower 103 to a UE 101, provide nationwide, citywide, or other area wide alerting (e.g., for emergencies), weather reports, mass messaging, location based news, traffic news, advertisements, area names, etc. CBS messages can be periodically sent from the cell tower 103 to the UEs 101 within range of the cell tower 103. Moreover, CBS messages can be sent via multiple cell towers 103. As such, a network service operator need not ascertain the mobile number of each UE 101 in its area or adjust its throughput (e.g., the number of messages to send per second). CBS messages may be sent on different channels and the UE 101 can choose to tune into certain channels to receive the information. Some network service operators broadcast area information in a textual format that is human comprehensible (e.g., comprehensible area name such as "Pennsylvania Avenue" or "Georgetown") to the general population on certain channels (e.g., channel 50 or channel 51). Different service operators may send area information or other information using different channels. Further, different operators may transmit area information (e.g., CBS names) and the area information may be slightly different than other operators transmitting the area information from the same cell tower 103. This information can be transmitted to the location services platform 111, which may merge information collected from different operators. Moreover, a cell tower 103 broadcasting a CBS message can transmit an area information associated with the cell tower 103.

In one embodiment, UEs 101 may collect CBS message information by listening to one or more CBS message channels and CellID information from a GSM control channel. A location application 109 of one of the UEs 101 may be associated with a location services platform 111 (e.g., via registration). The location application 109 may then be used to capture the CBS message and extract CBS message identifier information (e.g., area name, location, etc.), from the CBS message as well as other information available to the UEs 101 such as date, time, and optional information such as latitude, longitude, altitude etc. and store the information in a memory. The location application 109 can determine CellID information associated with the CBS message based on the fact the UE 101 has information relating to which cell the UE 101 is connected to while receiving the CBS message. According to some embodiments, a CBS message identifier or a cell broadcast message identifier includes textual information about an area associated with a cell tower 103. Examples of CBS message identifiers include an area name, a location, a landmark, or other like descriptive area information.

Under some scenarios, the UE 101 may not be capable of capturing a CBS message, but is able to capture CellID information. In this case, the UE 101 can extract date, time, and CellID information from a connection to the cell tower 103. In other scenarios, the UE 101 may be capable of retrieving GPS coordinates of the user. Under this scenario, the UE 101 may add the GPS coordinate information to the data set associated with the extracted information. This extracted information can then be sent to a location services platform 111 for analysis. Additionally or alternatively, one or more data sets can be transmitted from the UE 101 to the location services platform 111 at a time. The transmission can be via SMS, GPRS, MMS, over an internet protocol, or the like. Additionally, the data collection and transmission can be based on a time period (e.g., collect information every second, transmit the information every ten seconds, collect and transmit information every 5 seconds etc.) or based on an event (e.g., collect a data set when the CellID changes or changes for at least a certain threshold time period or when CBS area information (e.g., a CBS name) changes or changes for at least a certain threshold time period). Additionally or alternatively, the entire CBS message may be sent to the location services platform 111 and the location services platform 111 may extract information from the message.

In one embodiment, the system 100 includes the location services platform 111. The location services platform 111 can collect CBS message information including CBS message identifier information, CellID information, timing information, date information, GPS information, a combination thereof, or the like from a plurality of UEs 101 via crowd-sourcing. CellID information associated with the CBS message can be determined by capturing the CellID of the cell tower 103 that the UE 101 is connected to when receiving the CBS message. With this crowd-sourcing, the system 100 can become more accurate as more information is gathered from UEs 101. In certain embodiments, CBS message identifier information may include area information in a textual format that is comprehensible to the general population. Examples of CBS message identifier information can include a name of a street associated with an area a cell tower 103 transmitting the CBS message, an area associated with the cell tower 103 location, landmarks associated with the cell tower 103 location or other information associating the cell tower 103 to locations. In one scenario, different operators controlling CBS broadcasts transmitted from the same cell tower 103 can send area information that may have a slightly different spelling or annotation. For example, one operator may transmit "Pennsylvania Avenue" as area information while another operator may transmit "Pennsylvania Ave." A name matching technique can be used to determine if the two area names refer to the same area. Additionally or alternatively, collected GPS information may be used to determine if the two area names refer to the same area by correlating and analyzing GPS information of UEs 101 associated with the two area names. The CBS message identifier information can be associated with the CellID information and stored in the CBS information database 113. The CBS information database 113 can thus include a data structure that maps CBS message identifier information to CellIDs. Moreover, captured CBS message identifier information, CellID information, and timing information can be used to construct a connectivity graph. For example, two cells are connected as neighbors if a UE 101 transmits information is analyzed to determine that the UE 101 was in area A and then moved into area B from area A. Data from the plurality of UEs 101 may be used to determine the connectivity of cells.

Moreover, GPS information collected can also be associated with the cells and the connectivity graph to determine an area of coverage of the cells. Further, the GPS coordinates may be aggregated to determine a centroid or geometric center of the area of the cell. An estimated centroid may be determined by taking a mean of the GPS coordinates associated with the cell. Additionally, the centroid locations can be used to determine estimated distances from one cell to another. This information can be added to the connectivity graph to determine a proximity graph that includes distance values associated with each edge, that is each pair of connected cells.

Additionally or alternatively, the location services platform 111 can associate the cells with POIs and maps in a map database 115. One method of making this determination is to map the cell to a map using the GPS coordinates or other location coordinates of the centroid. Another method is to determine a coverage area of the cell using GPS coordinates or other location coordinates. Further, POIs can be associated with GPS coordinates or other location coordinates that can be used to associate the POIs with the coverage areas of the cells.

Additionally, the location services platform 111 can provide location based services to UEs 101. The location services platform 111 can receive location based queries from UEs 101. The location services platform 111 can then determine a response to the query based on the map database 115 and the CBS information database 113. In one embodiment, query includes a request for the location services platform 111 to determine directions to a destination location based on a current location that is represented by a CBS message identifier or a CellID. A cell can be associated with the destination location (e.g., a POI) using the map database 115. Then, the location services platform 111 can then determine a path from the current location to the destination location using the connectivity graph or the proximity graph. The connectivity graph can provide one or more routes through cells to the destination location. The proximity graph can be used to determine a shortest path determined using the distances between connected cells. The CBS message identifiers (e.g., an area name) associated with the cells along the path can then be transmitted to the UE 101, which can render a presentation of the information to a user.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, and location services platform 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
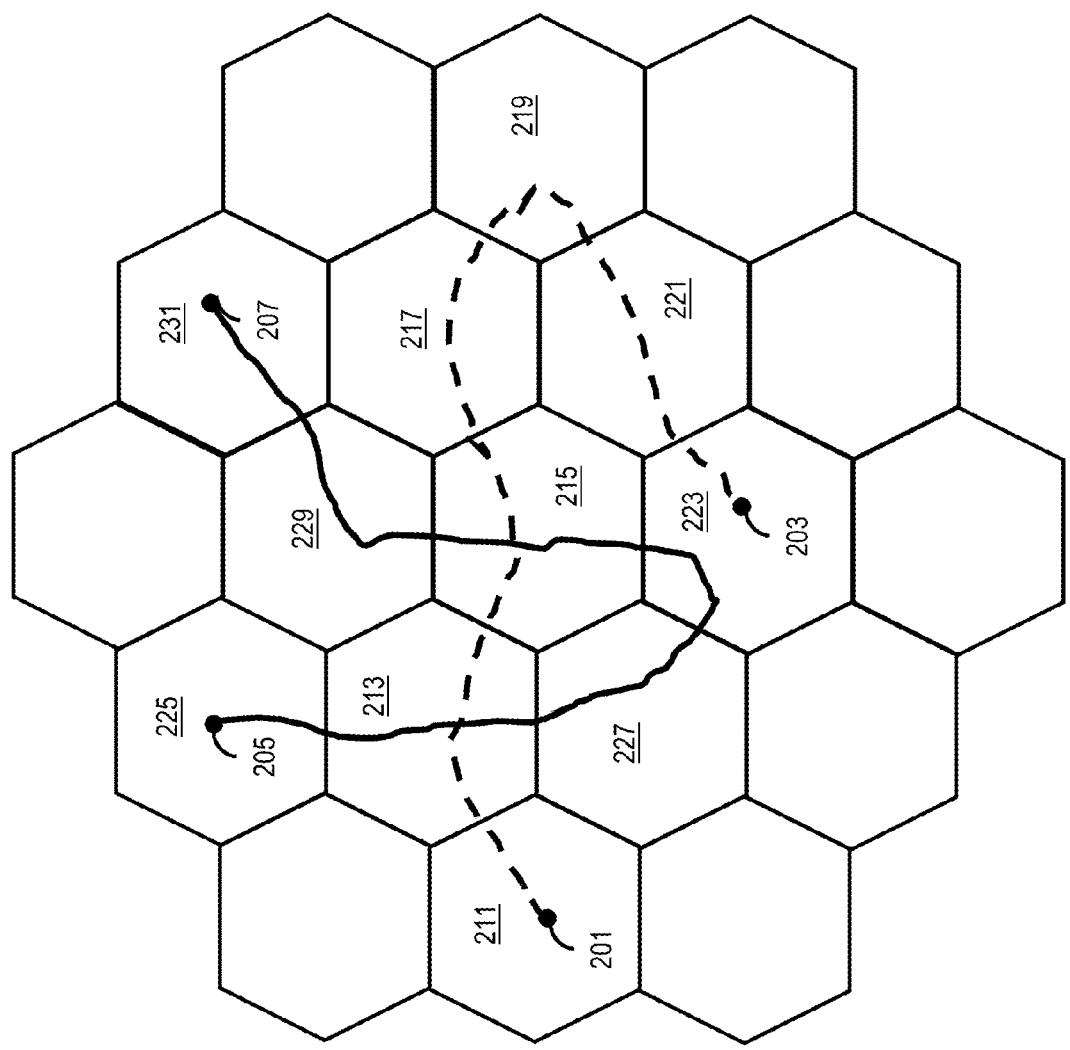
FIG. 2 is a diagram of a group of cells that can be used to illustrate relationships of a connectivity graph, according to one embodiment.

FIG. 2 is a diagram of a group of cells that can be used to illustrate relationships of a connectivity graph, according to one embodiment. The diagram shows the paths of two users, user A from point 201 to point 203 and user B from point 205 to point 207. These paths illustrate the collection of information and analysis used to create a connectivity graph. User A travels from cell 211 to cell 213, cell 213 to cell 215, cell 215 to cell 217, cell 217 to cell 219, cell 219 to cell 221, and cell 221 to cell 223. Each of these cells can be associated as neighbors with the cell that user A travel to or from. For example, cell 211 is connected to cell 213, while cell 213 is connected to cell 211 and cell 215. Then the path that user B takes adds more information to the connectivity graph. User B travels from cell 225 to cell 213, cell 213 to cell 227, cell 227 to cell 223, cell 223 to cell 215, cell 215 to cell 229, and cell 229 to cell 213. This adds to the information in the connectivity graph as to which cells are connected. For example, now cell 213 is connected with cell 211, cell 215, cell 225, and cell 227 in the connectivity graph. Using this method, greater cell connections can be determined.

Figure 3:
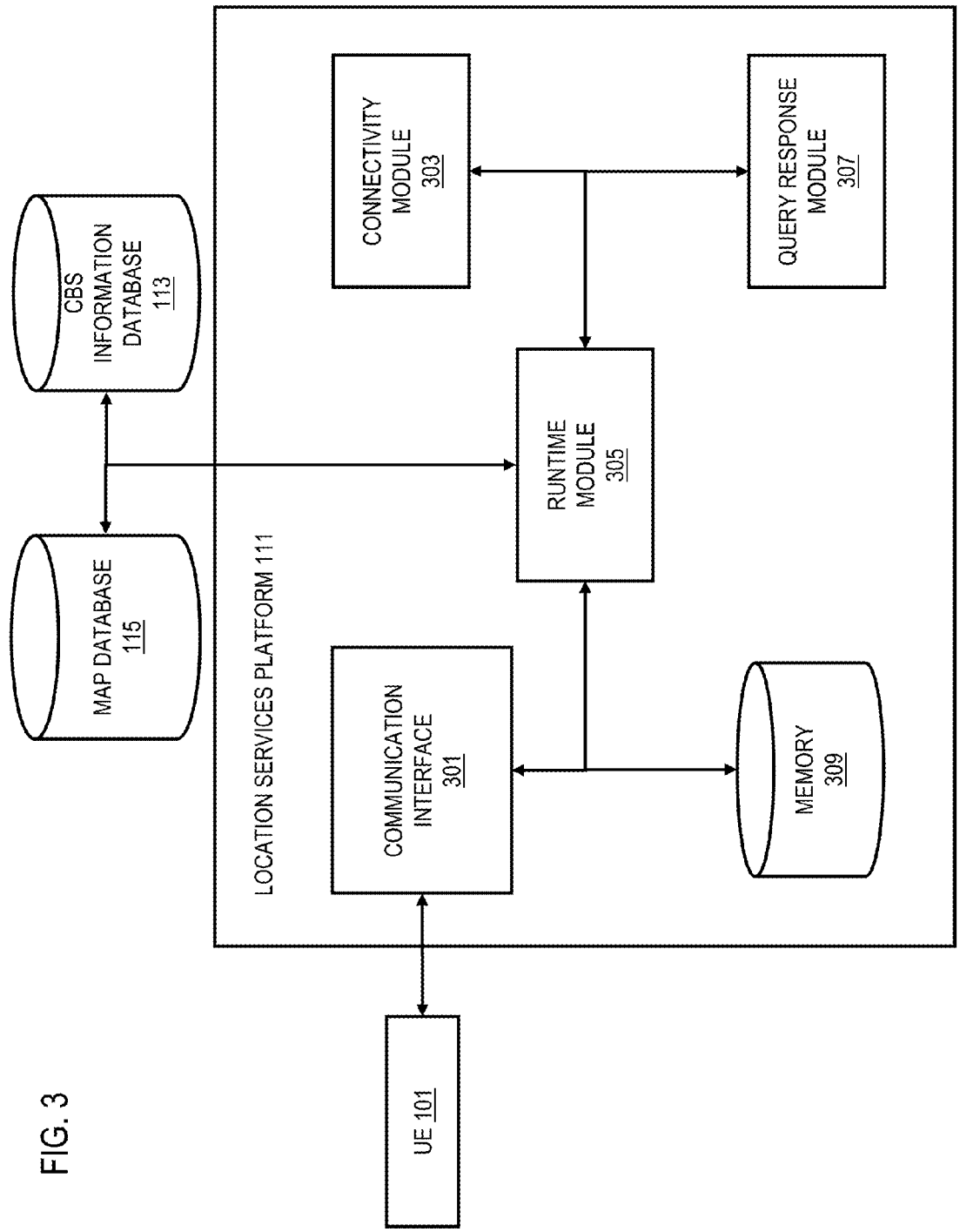
FIG. 3 is a diagram of the components of a location services platform, according to one embodiment.

FIG. 3 is a diagram of the components of a location services platform 111, according to one embodiment. By way of example, the location services platform 111 includes one or more components for providing location based services using connectivity graphs based on cell broadcast information. It is contemplated that the functions of these components may be combined in one or more components or performed by other components of equivalent functionality. In this embodiment, the location services platform 111 includes a communication interface 301, a connectivity module 303 that can be used to determine the connectivity of two cells, a runtime module 305 that can execute processes, a query response module 307 that can be used to determine an answer to a query received from a UE 101, and a memory 309.

In one embodiment, the location services platform 111 includes a communication interface 301. The communication interface 301 can be used to communicate with a UE 101. The location services platform 111 can receive information from the UE 101 via the communication interface 301 via methods such as internet protocol, MMS, SMS, GPRS, or any other communication method. The UE 101 can send information to the location services platform 111 to populate the CBS information database 113. This information can include CBS message identifiers, CellIDs, timing information, date information, GPS information, other location information, or a combination thereof. Moreover, the UE 101 or another UE 101 can send a query to the location services platform 111 to request location based services. The runtime module 305 can receive the query from the communication interface 301 and forward the query to a query response module 307 that can determine a response answer. The runtime module 305 can then receive the response from the query response module 307 and forward the response to the communication interface 301 to transmit to the UE 101. The response can be stored in a memory 309 until ready to be sent.

In one embodiment, the location services platform 111 includes a connectivity module 303. The connectivity module 303 can be used to process information collected and stored in the CBS information database 113 to determine a connectivity graph or a proximity graph of collected cell information. An example of the process to determine a connectivity graph is provided in the description of FIG. 2. In one embodiment, the connectivity graph can be represented as a proximity graph with an added parameter of a distance between two connected cells. The distance can be determined using GPS coordinates and determined centroids of respective cells as previously described. The connectivity module 303 may also be used to associate cells in the CBS information database 113 with location areas and POIs in the map database 115.

In another embodiment, the location services platform 111 includes a query response module 307. The query response module 307 can receive a location based query from a UE 101 via the communication interface 301 and determine a response answer to the query. The query can include a location search (e.g., finding local establishments, businesses, POIS, etc.), navigation (such as directions), location based messaging, location based social networking (e.g., finding directions to the location of a friend), etc. In one embodiment, the query includes a request for a local search of POIs. The UE 101 can send a query that specifies cell information (e.g., a CBS message identifier or a CellID) of the user's current location and a request providing search information. The query response module 307 receives this information and associates the cell information with a cell in the CBS information database 113. The query response module 307 then determines a local search area (e.g., a set of cells) based on the cell information and the query request, which can include area options (e.g., the current cell and neighboring cells). Moreover, the query response module 307 can determine a local search result based on the local search area and the search information associated with the request. The search result can include a one or more of the POIs searched for as well as CBS message identifiers (e.g., an area name) associated with the POI.

Figure 4:
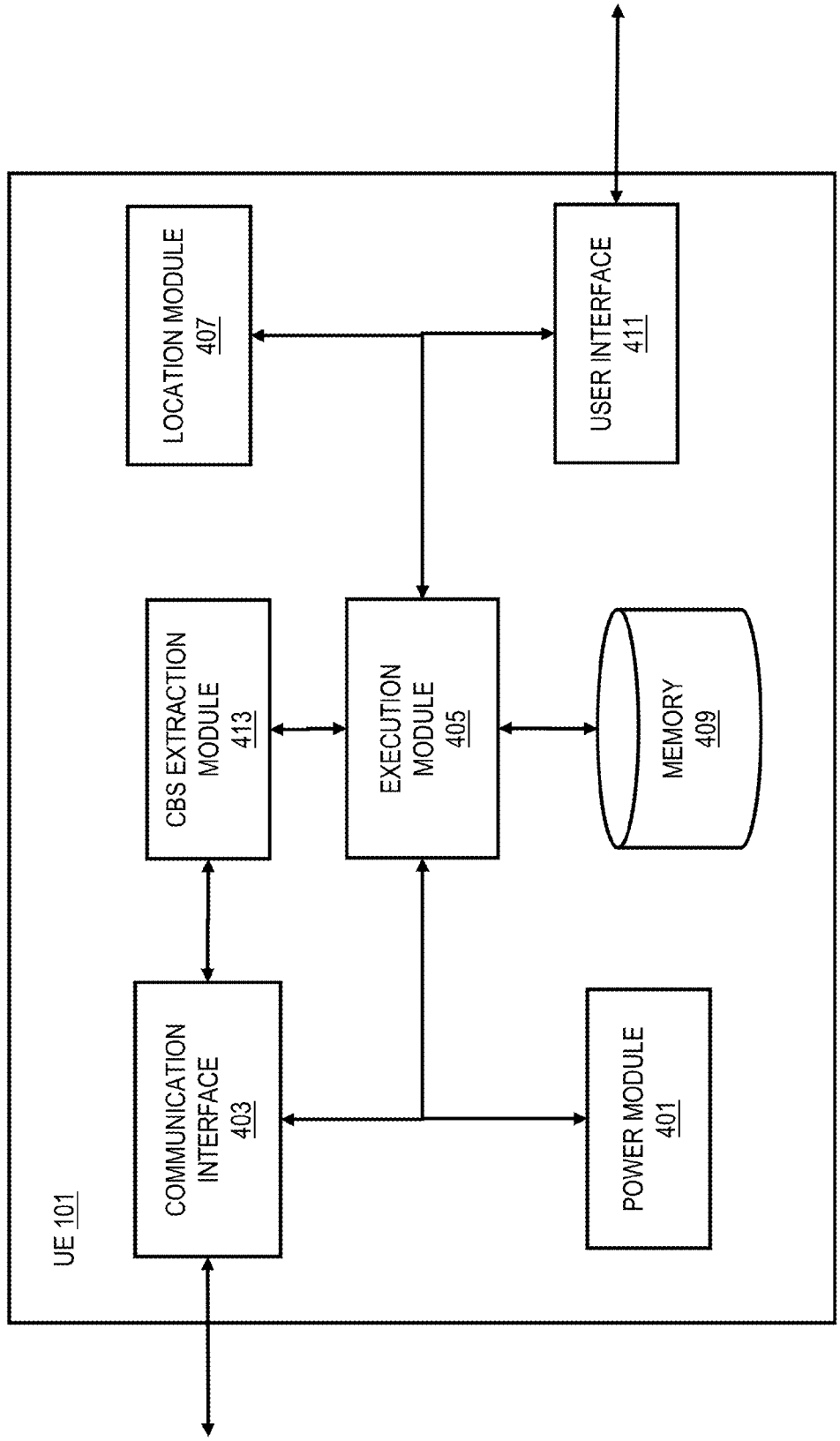
FIG. 4 is a diagram of the components of a user equipment that can collect information to create a connectivity graph and consume location based services, according to one embodiment.

FIG. 4 is a diagram of the components of a user equipment 101 that can collect information to create a connectivity graph and consume location based services, according to one embodiment. It is contemplated that the functions of these components may be combined in one or more components or performed by other components of equivalent functionality. In this embodiment, the UE 101 includes a power module 401, a communication interface 403, an execution module 405, a location module 407, a memory 409, a user interface 411, and a CBS extraction module 413.

In one embodiment, the UE 101 includes a power module 401. The power module 401 provides power to the UE 101. The power module 401 can include any type of power source (e.g., battery, plug-in, etc.). Additionally, the power module 401 can provide power to the components of the UE 101 including processors, memory 409, and transmitters.

The UE 101 may include a communication interface 403. The communication interface 403 may include multiple means of communication. For example, the communication interface 403 may be able to communicate over SMS, internet protocol, CBS messaging, or other types of communication. The communication interface 403 can be used by the execution module 405 to communicate with other UEs 101, the location services platform 111, receive CBS messages from cell towers, and other like communications. In some examples, the communication interface 403 is used to transmit information about the location of the UE 101. In other examples, the communication interface 403 is used to send and receive messages about a query. It is noted that although one communication interface 403 is shown, multiple communication interfaces may be utilized depending on the implementation.

In one embodiment, the UE 101 includes a CBS extraction module 413. The CBS extraction module 413 can be utilized to extract information from the CBS messages. A CBS message can be received via the communication interface 403 and forwarded to the CBS extraction module 413 to extract one or more of a CBS message identifier, time information, and date information from the CBS. Moreover, the CellID of the cell tower 103 transmitting the CBS message can be determined by the UE 101 and associated with the CBS message identifier, time information, and date information. Additionally or alternatively, the time information and/or date information may be determined based on UE 101 information and need not be extracted from the CBS message. The information can be stored in the memory 409. Further, the execution module 405 can additionally store additional location information (e.g., GPS coordinates) corresponding to the extracted data in the memory 409. The execution module 405 can determine a time to send the collected information to a location services platform 111. The time can be determined based a time period, a threshold amount of information being collected, or an event (e.g., a change in the CBS message identifier or CellID).

In one embodiment, a UE 101 includes a location module 407. This location module 407 can determine a user's location. The user's location can be determined by a triangulation system such as GPS, A-GPS, Cell of Origin, or other location extrapolation technologies. Standard GPS and A-GPS systems can use satellites to pinpoint the location of a UE 101. A Cell of Origin system can be used to determine the cellular tower 103 (e.g., via CellID) that a cellular UE 101 is synchronized with. Moreover, UE 101 may be able to receive a CBS message broadcast from a cellular tower 103. In some embodiments, the UE 101 can have one or more of the location extrapolation technologies. In one example, the UE 101 may use GPS coordinates to associate CellIDs and CBS message identifiers with GPS coordinates to send to a location services platform 111. In another exemplary embodiment, the UE 101 is able to only receive CellID information. The location services platform 111 can determine a mapping of the CellID to determine a CBS message identifier using the CBS information database 113 and map database 115. The location module 407 may also utilize multiple technologies to detect the location of the UE 101. GPS coordinates can provide finer detail as to the location of the UE 101 than other methods.

In one embodiment, a UE 101 includes a user interface 411. The user interface 411 can include various methods of communication. For example, the user interface 411 can have outputs including a visual component (e.g., a screen), an audio component, a physical component (e.g., vibrations), and other methods of communication. User inputs can include a touch-screen interface, a scroll-and-click interface, a button interface, etc. In one embodiment, a user can input a request to upload or receive object information via the user interface 411. The user interface 411 may be used to receive a location based query from a user to send to the location services platform 111 and to present a received response to the query to the user. Moreover, in one embodiment, the user interface 411 may be used to determine settings to collect and transmit location data and CBS message information to a location services platform 111.

Figure 5:
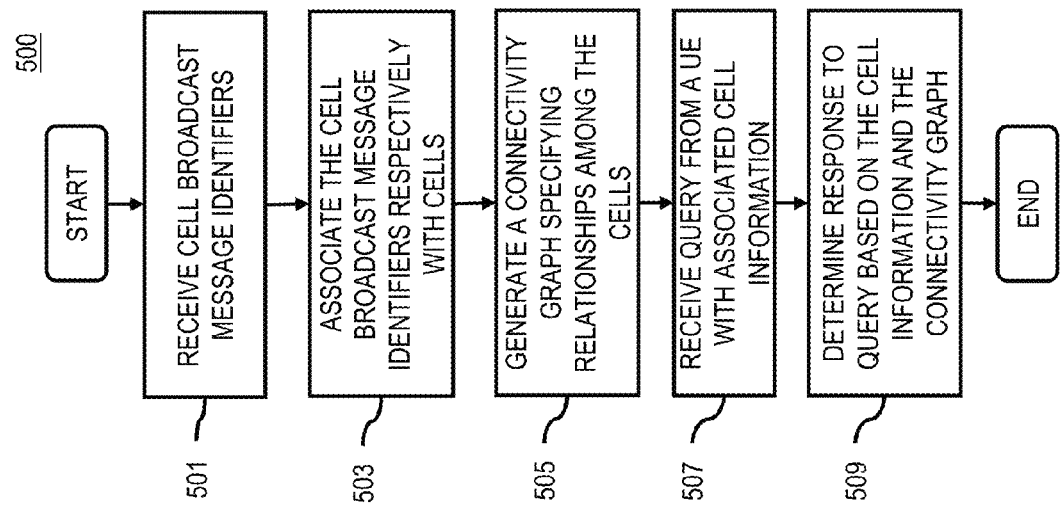
FIG. 5 is a flowchart of a process for providing location based services based on a connectivity graph, according to one embodiment.

FIG. 5 is a flowchart of a process 500 for providing location based services based on a connectivity graph, according to one embodiment. In one embodiment, the runtime module 305 performs the process 500 and is implemented in, for instance, a chip set including a processor and a memory as shown FIG. 10. A location services platform 111 may be used to collect CBS message information from UEs 101, analyze the CBS message information to create a connectivity graph, and use the connectivity graph to provide location based services.

At step 501, the runtime module 305 is caused, at least in part to receive a plurality of CBS message identifiers from UEs 101. CBS message identifiers can be received as part of a message from one of the UEs 101. The message may also include other associated information, such as a CellID, a time, a date, and/or GPS coordinates. The identifiers can be received from the UE 101 via a communication system, such as GPRS, MMS, SMS, Internet, etc. If the identifiers are received via a communication system associated with a telephony network for example, the received messages can be sorted via a port number or a phone number. Moreover, the collected data can be associated with a UE 101 via an identification of a phone number associated with the UE 101. In some embodiments, identification information may be stripped from the message before the information is stored in a database to protect user privacy. In other embodiments, information from a user can be correlated to determine a path of the user. The path can include travel from one cell to another cell as described in the discussion of FIG. 2. Moreover, the path of users during certain time periods or between certain events (e.g., staying in one place for longer than a threshold period of time) can additionally be stored. This information can be used to determine frequency of traveled paths.

At step 503, the CBS message identifiers can be respectfully associated with a plurality of cells. The cells may be associated with different networks. Some of the received messages can include both CBS message identifiers and CellIDs. This information can be stored in a CBS information database 113 to create a CBS message identifier and CellID lookup table. This mapping of CBS message identifiers to CellIDs allows the location services platform 111 to provide CBS message identifiers, which refer to area names, to users on UEs 101 of locations. This CBS message identifier and CellID lookup table can be beneficial because some UEs 101 may not have the capability to receive CBS messages. In this case, the CellID can be used to determine a CBS message identifier. Additionally, the CBS message identifiers received can be analyzed to ensure that the CBS message identifiers provide a description of an area.

Under some scenarios, the CBS message identifier field of a CBS message can include an advertisement. Under this scenario, advertisements can be filtered out. Advertisements can be determined based on one or more rules. One such rule can include determining if the CBS message identifier field includes numbers. Generally, a descriptive location of a CBS message identifier need not include numbers, but advertisements on UEs 101 may include phone numbers to call. Moreover, more than one CBS message identifier may be associated with a CellID. This can occur if more than one service providers use the same cell tower 103. Each may have different identifiers in the CBS message identifier field. During the data aggregation process, a primary CBS message identifier can be determined based on the number of times the CellID of the cell is associated with the CBS message identifier.

Then, at step 505, the runtime module 305 can generate a connectivity graph specifying relationships among the cells. The runtime module 305 can generate the connectivity graph based on the CBS message identifier and CellID lookup table as well as paths observed of one or more UEs 101. As described in the discussion of FIG. 2, the path of a user can be used to associate connectivity of cells. Moreover, the path of a user can be stored to determine which paths are frequently taken by users. This information can help determine traffic patterns, such as which path is most commonly taken by users from a starting point to a destination point. Moreover, time can be associated with the path so that the runtime module 305 can determine traffic patterns of commonly used paths during times of day (e.g., during rush hour). Thus, commonly used paths can be suggested to a user based on a time of day. A cell is connected to another cell if it is observed that a user has moved from one cell to the other cell. The information collected in the messages can be filtered to more accurately determine if a UE 101 actually moved from one cell to the other cell. This filtering can be done based on requiring a threshold amount of matching sample sets of information before marking a transition. The filtering may be used to ensure that a momentary connection by the UE 101 to a cell tower 103 need not lead to an associated connection between the two cells. Filtering can be accomplished on the location services platform 111 or UEs 101.

Moreover, the connectivity graph can be associated with distance or time elements to determine a proximity graph. In a proximity graph, the edges between two cells can have a distance element, a time element, a weight element, or a frequency element associated with it. Thus, a first cell and a second cell can have an associated distance stored in the CBS information database 113. As discussed previously, the distance can be determined by determining a centroid of the first cell and the second cell based on received messages and determining a distance from the center of each cell. As additional information can be collected dynamically, the centroid of the cells can change over a period of time. Moreover, a time distance can be used to determine the proximity graph. In this scenario, average times of travel of various users from one cell to another cell may be used to determine a time-based distance proximity parameter. A time-based distance proximity parameter can be determined by determining a baseline speed of travel for an area including the first cell to the second cell. The average time of traveling from the first cell to the second cell can be observed. This average time can be multiplied with the baseline speed to determine a time-based distance between the first cell and the second cell. A shortest path between two locations may be determined based on the time-based distances between cells in the proximity graph. Additionally or alternatively, an edge can include a frequency of the number of observations of transitions from the first cell to the second cell. A transition observation between two cells corresponds to a CBS message that includes a direct movement between these cells and is represented as adjacent nodes in the connectivity graph. The frequency can be represented as a total number of transitions observed from the first cell to the second cell. Further, the frequency of transitions can be collected for an entire path e.g., from a start point (point A) to a destination point (point D) via point B and point C. Thus, the number of times a path is taken can be stored. The frequency of a path reveals information as to determining frequently used or popular routes between the start point and the destination point. Moreover, the time element can be added to the frequency element to create a time-frequency element that can be used to simulate real-time routing for a user's observation. The time-frequency of a path can be used to display the traffic patterns of users between the start point and destination point during certain time periods (e.g., rush hour, lunch hour, midday, etc.). The connectivity graph, CBS message identifier to CellID lookup table, and proximity graph can then be used to provide location based services to UEs 101.

At step 507, the runtime module 305 can be caused to, at least in part, receive a location based query from a UE 101 with associated cell information. The location based query is received via the communication methods described in step 501. The query may specify cell information such as a CellID or a CBS message identifier. This cell information can represent a current or recent location of the UE 101. The query may also include query information describing the type of query and query parameters. In one embodiment, the query is a request for directions to a destination. The destination is an example of a query parameter. In another embodiment, the query may be a city guide or a request for a local search of POIs and the name of the POI or the type of POI may be a query parameter. Additionally, the query can have an area parameter describing the area to search; the area can be represented based on cell relationships.

Next, at step 509, a response to the query is determined based on the cell information and the connectivity graph or proximity graph. The query is associated with one of the cells in the connectivity graph based on the cell information. A response to the query is then generated based on the query parameters and the connectivity graph and/or proximity graph.

In one embodiment, the query includes a request for directions. In this embodiment, the query includes a specified destination. The destination can be mapped onto another one of the cells (e.g., nodes) of the connectivity graph. In one example, the destination can be mapped to the other cell because the destination is specified by a CBS message identifier. In another example, the destination is mapped onto the other cell by determining GPS coordinates of the destination (e.g., an address) and determining the other cell by associating the GPS coordinates with an area encompassed by the other cell. Then a path or more than one path through one or more cells from the current location to the destination is determined. Next, the runtime module 305 can use the lookup table to determine CBS message identifiers that are associated with the cells on the path. These CBS message identifiers may include area names of the respective cells on the path. The determined response may also include the CBS message identifiers (e.g., area names) of the path. In one embodiment, the connectivity graph is a proximity graph. In this embodiment, the distances of the cells can be used to determine advantageous paths (e.g., an estimated shortest path) for the user to travel from the current location to the destination. A shortest route can be calculated by adding the estimated distances between the cells of the path. Ratings, such as rankings for shortest route, can be associated with the paths based on the proximity graph analysis. Moreover, the runtime module 305 may review other users' previously traveled paths from the current location to the destination to determine a most traveled path for the user if the query requests such a result. Further, the previously traveled paths can be weighted by a frequency or time-frequency. A frequency can be represented by the number of times a path is traversed. A popular route can be determined based on a frequency weighting. Additionally, a popular route during a certain time of day can be determined based on time-frequency, for example, a number of times a path was observed to be traversed during a certain time period (e.g., between 7 AM and 9 AM on weekdays).

In another embodiment, the query includes a request for a local search of points-of-interest. The query may specify cell information such as a CellID or a CBS message identifier as well as search information. The search information can include an area parameter selecting a range of how far to conduct the search from the user's current or recent location. This area parameter is used to select cells on the proximity graph or connectivity graph that correspond to the area as search locations. For example, the user may select an area of the user's current location as well as neighboring cells. Then, the runtime module 305 correlates this information with a map database 115 that associates the cells with geographic coordinates as well as POIs. The map database 115 can be created by correlating collected information about cells in the connectivity graph with GPS coordinates as previously discussed and then correlating the collected cells with POI associated with GPS coordinates. Moreover, a location search database may be created from the map database 115 that contains local search information (e.g., POI, POI types, etc.) associated with each CBS message identifier or CellID. This database can be generated by associating the GPS coordinates of POIs to cells. For example, the database may include names of restaurants in an area encompassed by a first cell. The local search is then conducted using a search parameter (e.g., a POI type or POI name). Once one or more POI search results are determined, the POI can be associated with a cell on the connectivity graph. The cell can be associated with a CBS message identifier that may include an area name. The POI and the area name and/or CBS message identifier can be included in the search result. The local search result can be part of the response. Then, the response can be transmitted to the UE 101 making the query.

According to the above approach, a range of UEs 101 can be provided location based services. Some of the UEs 101 may not currently be able to receive location based services because the services require the UE 101 to have sophisticated GPS information or because the services require a sophisticated transmission method such as via an internet protocol. As such, the above approach allows UEs 101 with limited capabilities to receive location based services. These services are additionally energy efficient because the services need not use energy costly technology such as GPS. Additionally, these services may be used in emerging countries that do not yet have a sophisticated road name system and users are more accustomed to travel directions based on landmarks.

Figure 6:
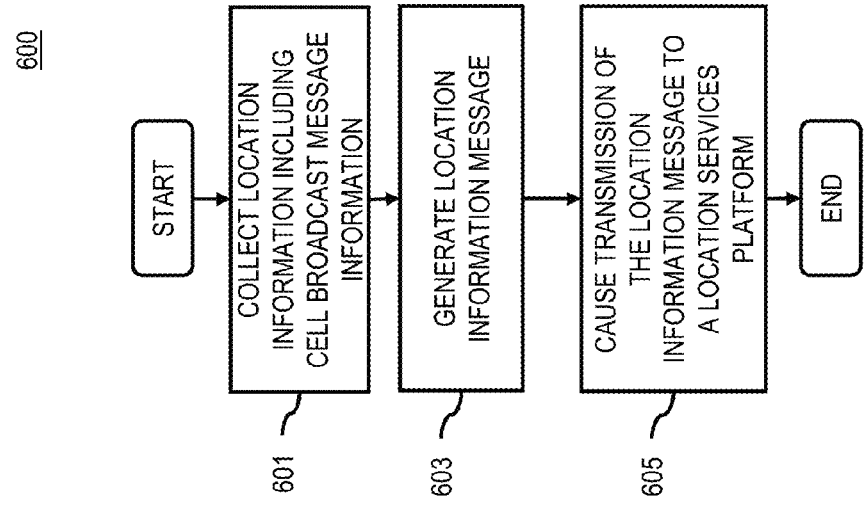
FIG. 6 is a flowchart of a process for collecting cell broadcast message information for a location services platform, according to one embodiment.

FIG. 6 is a flowchart of a process 600 for collecting cell broadcast message information for a location services platform, according to one embodiment. In one embodiment, execution module 405 of a UE 101 performs the process 600 and is implemented in, for instance, a chip set including a processor and a memory as shown FIG. 10. A user can register with a location services platform 111 to provide information CBS message information to the location services platform 111. The user can then activate a location application 109 on the UE 101 that can be executed by the execution module 405 to collect location information of the UE 101 for the location services platform 111.

At step 601, the location application 109 collects location information including CBS message information. The location application 109 may collect the CBS message information by listening to one or more CBS message channels. Cell towers 103 periodically send CBS messages to UEs 101 within range of the cell tower 103. The CBS messages may have embedded within the message a CBS message identifier. The location application 109 can extract the information from the CBS message identifier as well as other information associated with the CBS message. For example, a CellID the UE 101 is connected to when the CBS message is observed, the time, and the date, can be collected together. In one example, a portion of the header of the CBS message may include an area name. This information can be extracted and stored in a memory associated with other information (e.g., the CellID, time, date, etc.) about the CBS message. Moreover, if the UE 101 has GPS capabilities, the location application 109 may store GPS information in the memory as being associated with the extracted information. The extracted information and GPS information can be stored in an array of a data structure that includes variables for one or more of a CBS message identifier, a date, a time, a CellID, and GPS information. In some embodiments, the GPS information need not be collected for each item of the array. In some scenarios, another variable representing a count of the amount of consecutive CBS message identifiers and/or CellIDs that have been observed without a change is stored. Moreover, the variable for time may include a observation start time and a stop time.

Then, at step 603, a location information message is generated. The location information message may include one or more items of the array. In certain embodiments, the message is generated when a threshold amount of data is collected. In other embodiments, the message is generated based on an event, e.g., when there is a change in the CellID or CBS message identifier. Moreover, the message can be generated based on a time period of collecting information. In some examples, the message includes information describing the UE 101 so that the location services platform 111 can associate incoming message information with individual UEs 101.

Next, at step 605, the location application 109 causes, at least in part, transmission of the location information message to the location services platform 111. The transmission can be via SMS, GPRS, MMS, over an internet protocol, or the like. Additionally or alternatively, the transmission can be based on a time period, an event, a threshold collection of data, or when the location information message is generated. Moreover, the location application 109 may send the message to the location services platform 111 over a predetermined port.

Figure 7:
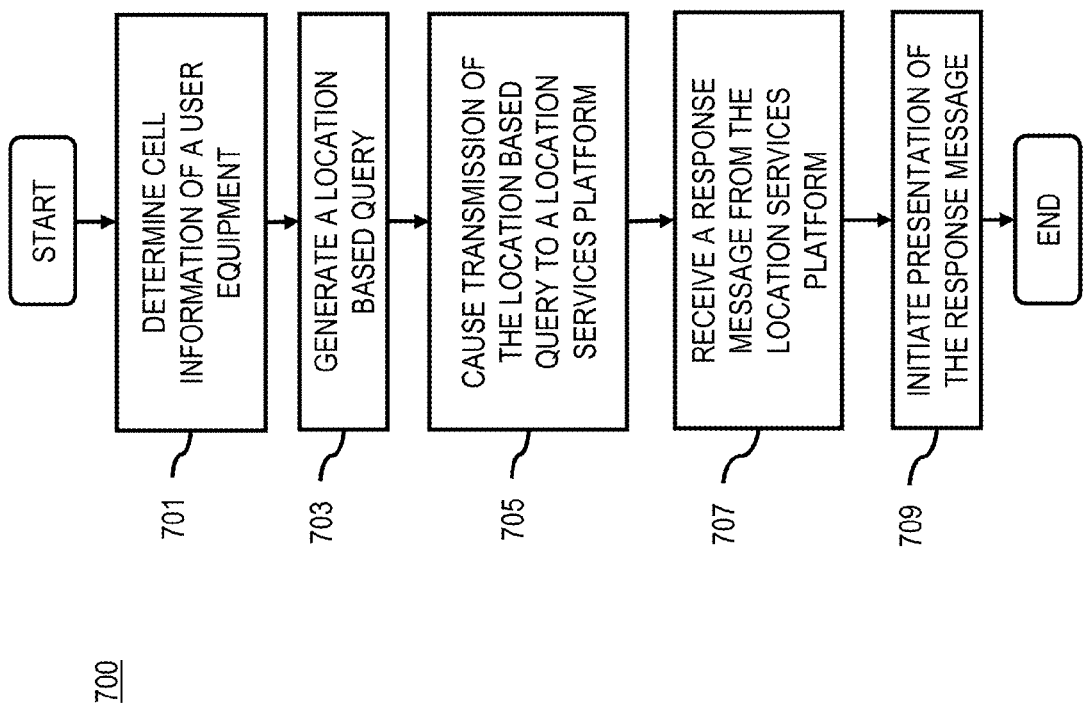
FIG. 7 is a flowchart of a process for consuming location based services, according to one embodiment.

FIG. 7 is a flowchart of a process 700 for consuming location based services, according to one embodiment. In one embodiment, the execution module 405 performs the process 700 and is implemented in, for instance, a chip set including a processor and a memory as shown FIG. 10. A user of the UE 101 may utilize an application 109 (e.g., a navigation application 109) executing on the execution module 405 to request location based services from the location services platform 111. Examples of location based services may include identifying POIs (e.g., local establishments, landmarks, or restaurants) nearby the user's current location, navigation to a destination, receiving other information about POIs (e.g., advertisements, coupons, etc.), receiving location based weather information, etc.

At step 701, the execution module 405 determines cell information of the UE 101. The cell information can include a current or recent CBS message identifier or a CellID. In one embodiment, the CBS message identifier unavailable. The reason for the lack of availability could be a lack of a signal or a lack of capability of the UE 101. In this exemplary embodiment, the cell information may include a CellID.

Then, at step 703, the execution module 405 generates a location based query. The location based query can specify the cell information to the location services platform 111. The location based query can also include other parameters necessary to receive a particular type of location based service such as a search identifier (e.g., POI name, POI type, etc.) or destination location (e.g., an address, a POI name, GPS coordinates, etc.). In one embodiment, the query is a request for directions and the other parameters include a destination. In another embodiment, the query is a request for a local search of POIs and the other parameters include a POI description and/or search area information. Search area information could include a range of the distance of POIs from the current location of the UE 101 that the user is interested in. Then, at step 705, the execution module 405 causes, at least in part, transmission of the location based query to the location services platform 111. In certain embodiments, when communicating via a telephony network, the application 109 and location services platform 111 can be associated with phone numbers and ports to associate incoming and outgoing messages with a certain type of service. For example, the application 109 can send a query to a different phone number and/or port of the location services platform 111 based on the service requested by the query. This query may be processed by a location services platform 111 as indicated in the process 500 of FIG. 5. The query processing may include determining a response based on a proximity graph or connectivity graph.

Next, at step 707, the execution module 405 receives a response message from the location services platform 111. In this embodiment, the application 109 can be set to monitor messages received by the UE 101 on certain ports or via certain phone numbers that can be associated with the location services platform 111. The response message may specify an answer to the query including one or more CBS message identifiers to provide context to locations. In the embodiment of a query for directions to a destination, the response message may include a route that includes going through various cells with associated CBS message identifiers. The CBS message identifiers may provide context (e.g., street names, area neighborhoods, etc.) to the user of the places the user may travel through to arrive at the destination. In the embodiment of a query for a local search of POIs, the response message can include a POI description (e.g., a POI name or POI type) and a CBS message identifier associated with the location of the POI. Then, at step 709, the response message can be caused, at least in part, to be presented by the execution module 405.

FIG. 8 is a diagram of a user interface utilized in the processes of FIG. 7, according to one embodiment. A user of a UE 101 may utilize a navigation application 109 on the user's UE 101 to display the user interface 800 of FIG. 8. The user may ask for navigation services from a location services platform 111. The user can query the location services platform 111 for directions to a destination address 801 from the current location 803 of the UE 101. In this embodiment, the user may be in Washington, D.C. The destination address 801 entered can be 1600 Pennsylvania Avenue. Additionally, the destination can be selected based on different parameters other than address, such as a CBS message identifier of the destination location or GPS coordinates of the destination. The destination address 801 and current location 803 are then transmitted to the location services platform 111 in a query. The location services platform 111 then determines a response and sends the response to the UE 101. The response can include CBS message identifiers that describe area names in the path from the current location to the destination location. The determined path can include the current location of the National Zoo 803, the next location of Dupont Circle 805, another intermediary location of Farragut North 807, and an arrival at the destination location of the White House 809. For example, the National Zoo 803, Dupont Circle 805, Farragut North 807, and White House are CBS message identifiers associated with cell towers 103 along the path from the user's current location 803 to the user's destination 809.

The processes described herein for providing location based services using connectivity graphs based on cell broadcast information may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
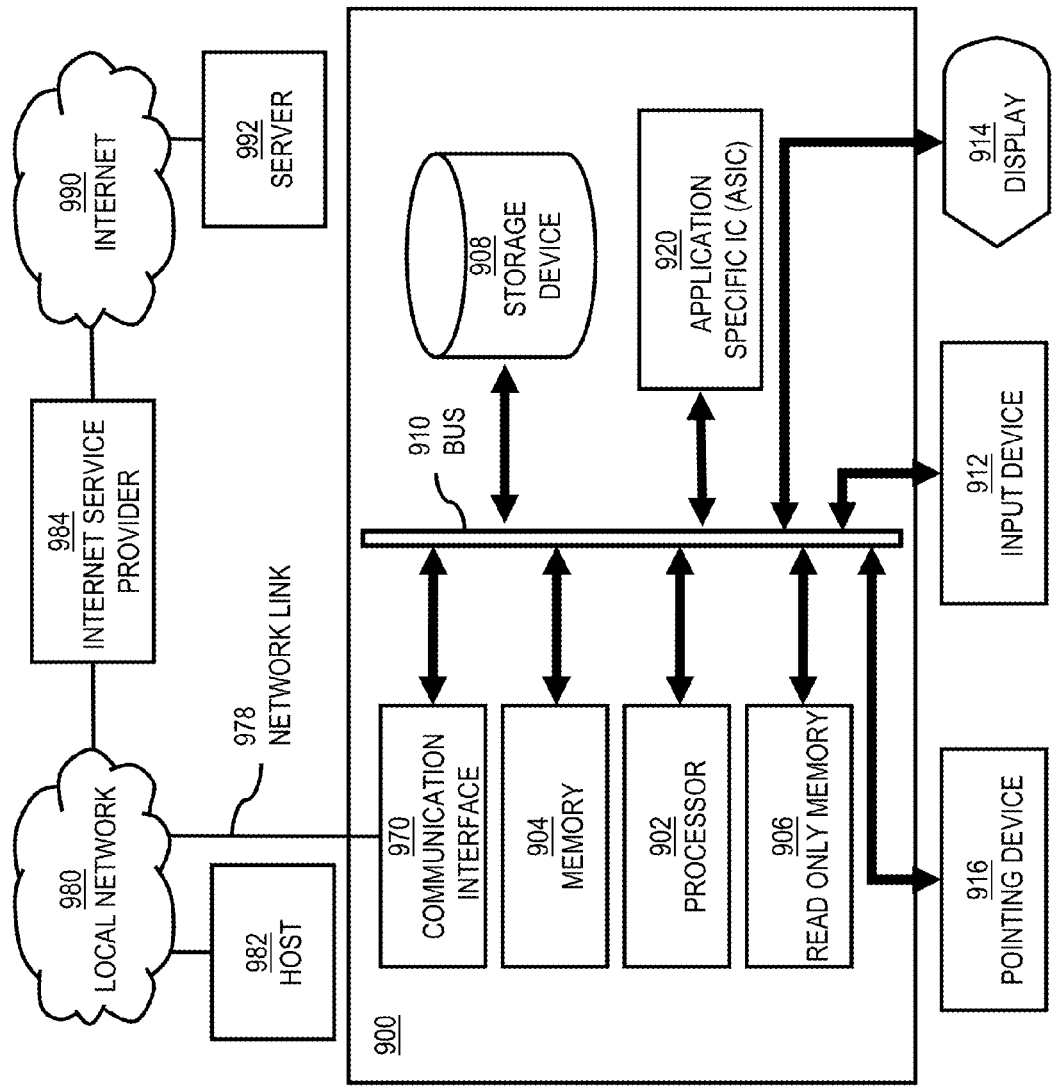
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide location based services using connectivity graphs based on cell broadcast information as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing location based services using connectivity graphs based on cell broadcast information.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing location based services using connectivity graphs based on cell broadcast information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing location based services using connectivity graphs based on cell broadcast information. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing location based services using connectivity graphs based on cell broadcast information, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for providing location based services using connectivity graphs based on cell broadcast information to the UE 101.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
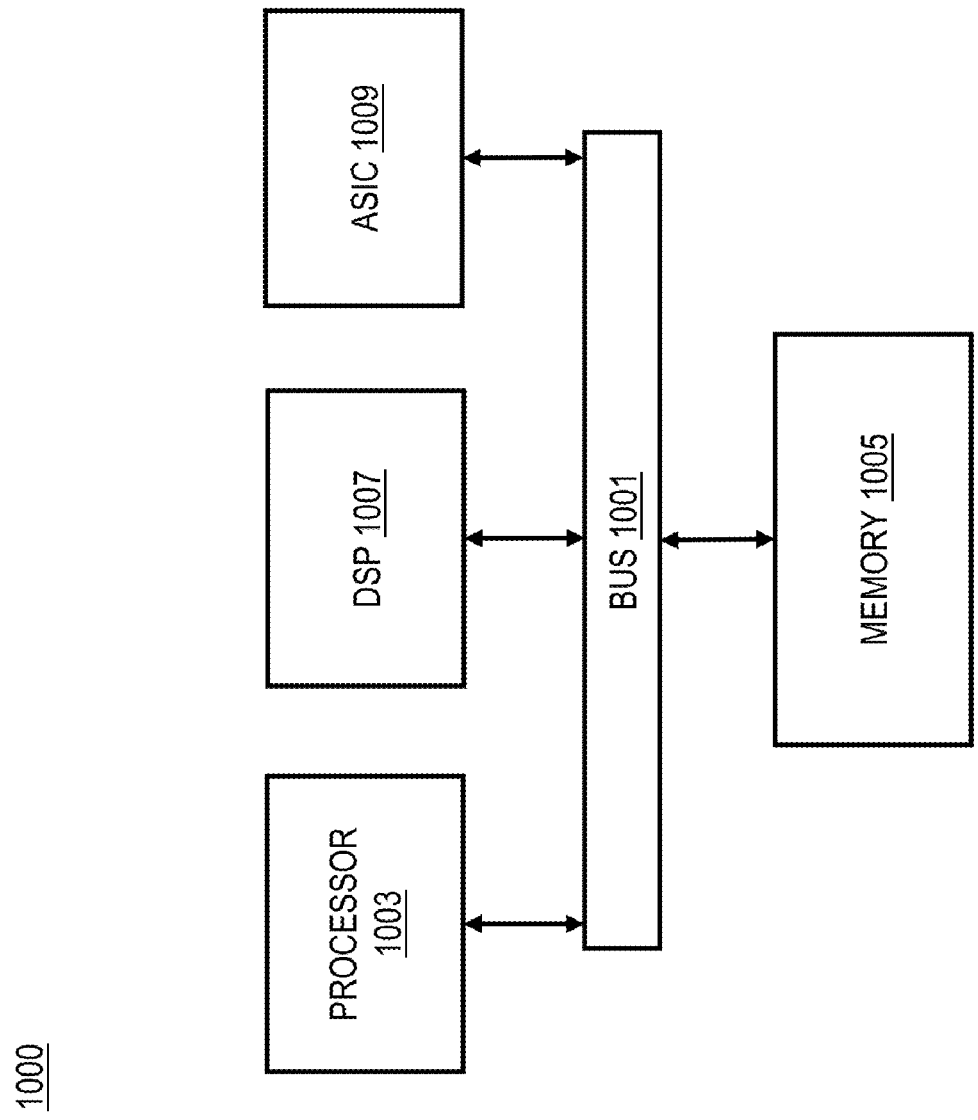
FIG. 10 is a diagram of a chip set that can be used to implement an embodiment of the invention.

FIG. 10 illustrates a chip set 1000 upon which an embodiment of the invention may be implemented. Chip set 1000 is programmed to provide location based services using connectivity graphs based on cell broadcast information as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of providing location based services using connectivity graphs based on cell broadcast information.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide location based services using connectivity graphs based on cell broadcast information. The memory 1005 also stores the data associated with or generated by the execution of the inventive steps.

Figure 11:
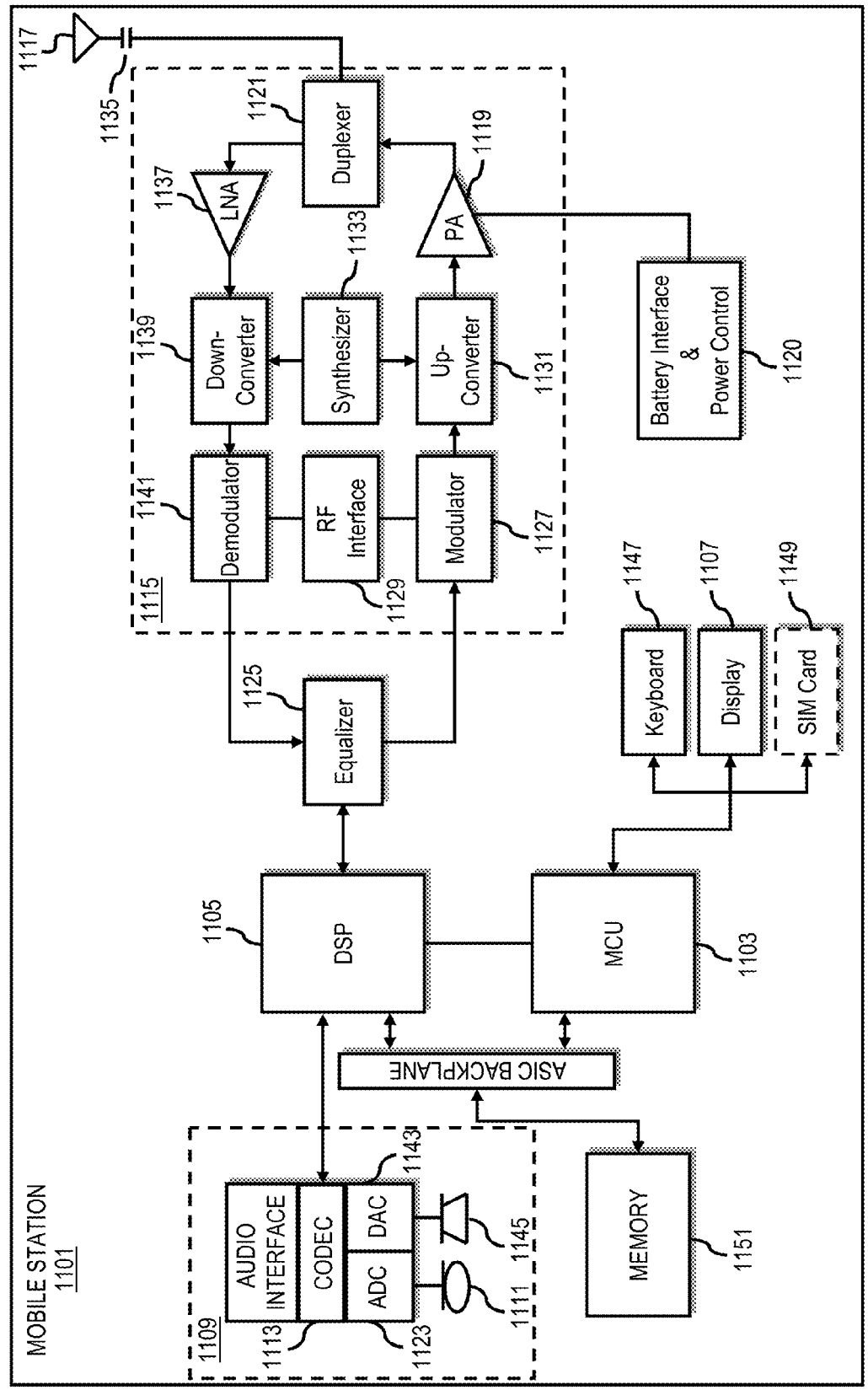
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1100, or a portion thereof, constitutes a means for performing one or more steps of requesting and receiving location based services using connectivity graphs based on cell broadcast information. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of requesting and receiving location based services using connectivity graphs based on cell broadcast information. The display 11 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to request and receive location based services using connectivity graphs based on cell broadcast information. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
  causing, at least in part, via a processor, receiving and storing in a memory a plurality of cell broadcast message identifiers;
  associating the plurality of cell broadcast message identifiers respectively with a plurality of cells;
  generating, based on the stored plurality of cell broadcast message identifiers, a connectivity graph specifying relationships among the plurality of cells for providing a location based service;
  receiving a query relating to the location based service;
  determining a response message to the query utilizing one or more cells of the connectivity graph; and
  causing, at least in part, transmission of the response message,
  wherein the plurality of cell broadcast message identifiers is provided by a plurality of mobile devices, and
  wherein storing the plurality of cell broadcast message identifiers comprises storing the plurality of cell broadcast message identifiers in a database of a service provider.

2. The method of claim 1, wherein
  the cell broadcast message identifiers include area names of the respective cells, and
  the query includes a request for a local search of points-of-interest, the method further comprising:
  determining a local search area that includes one or more cells of the connectivity graph based on the cell information and the query; and
  determining a local search result based on the local search area and the request,
  wherein the local search result specifies one of the points-of-interest and an area name associated with the one point-of-interest, and the response message includes the local search result.

3. The method of claim 1, wherein the transmission is via a short message service, a general packet radio service, a multimedia messaging service, or a combination thereof.

4. An apparatus comprising:
  at least one processor; and
  at least one memory including computer program code,
  the at least one memory and the computer program code configured to, with the at least one processor, cause the apparatus to perform at least the following,
  cause, at least in part, receiving and storing a plurality of cell broadcast message identifiers;
  associate the plurality of cell broadcast message identifiers respectively with a plurality of cells; and
  generate, based on the stored plurality of cell broadcast message identifiers, a connectivity graph specifying relationships among the plurality of cells for providing a location based service;
  receive a query relating to the location based service;
  determine a response message to the query utilizing one or more cells of the connectivity graph; and
  cause, at least in part, transmission of the response message,
  wherein the plurality of cell broadcast message identifiers is provided by a plurality of mobile devices, and
  wherein storing the plurality of cell broadcast message identifiers comprises storing the plurality of cell broadcast message identifiers in a database of a service provider.

5. The apparatus of claim 4, wherein
  the cell broadcast message identifiers include area names of the respective cells,
  the query includes a request for a local search of points-of-interest, and
  the apparatus is further caused, at least in part, to:
  determine a local search area that includes one or more cells of the connectivity graph based on the cell information and the query; and
  determine a local search result based on the local search area and the request,
  wherein the local search result specifies one of the points-of-interest and an area name associated with the one point-of-interest, and the response message includes the local search result.

6. The apparatus of claim 4, wherein the transmission is via a short message service, a general packet radio service, a multimedia messaging service, or a combination thereof.

7. A non-transitory computer-readable storage medium carrying one or more sequences of one or more instructions which, when executed by one or more processors, cause an apparatus to at least perform the following steps:
  causing, at least in part, receiving and storing a plurality of cell broadcast message identifiers;
  associating the plurality of cell broadcast message identifiers respectively with a plurality of cells; and
  generating, based on the stored plurality of cell broadcast message identifiers, a connectivity graph specifying relationships among the plurality of cells for providing a location based service;
  receiving a query relating to the location based service;
  determining a response message to the query utilizing one or more cells of the connectivity graph; and
  causing, at least in part, transmission of the response message,
  wherein the plurality of cell broadcast message identifiers is provided by a plurality of mobile devices, and
  wherein storing the plurality of cell broadcast message identifiers comprises storing the plurality of cell broadcast message identifiers in a database of a service provider.

8. The computer-readable storage medium of claim 7, wherein the cell broadcast message identifiers include area names of the respective cells, the query includes a request for a local search of points-of-interest, and the apparatus is caused, at least in part, to further perform:

determining a local search area that includes one or more cells of the connectivity graph based on the cell information and the query; and determining a local search result based on the local search area and the request, wherein the local search result specifies one of the points-of-interest and an area name associated with the one point-of-interest, and the response message includes the local search result.

9. The computer-readable storage medium of claim 7, wherein the transmission is via a short message service, a general packet radio service, a multimedia messaging service, or a combination thereof.

* * * * *